US006966738B1

(12) United States Patent
Weber et al.

(10) Patent No.: US 6,966,738 B1
(45) Date of Patent: Nov. 22, 2005

(54) AUTOMATIC FEEDER FOR CARRIER-SUPPORTED CONTACTS

(75) Inventors: Jerome L. Weber, Escondido, CA (US); David J. Kole, Murrieta, CA (US)

(73) Assignee: Auto Splice Systems, Inc., San Diego, CA (US)

( * ) Notice: Subject to any disclaimer, the term of this patent is extended or adjusted under 35 U.S.C. 154(b) by 0 days.

(21) Appl. No.: 10/147,398

(22) Filed: May 17, 2002

Related U.S. Application Data

(63) Continuation-in-part of application No. 10/027,869, filed on Dec. 20, 2001, now Pat. No. 6,691,859.

(51) Int. Cl.[7] ............................................ B23P 19/00

(52) U.S. Cl. ........................ 414/411; 29/33 M; 29/743; 29/759; 156/584; 414/416.04

(58) Field of Search .......................... 414/411, 416.04, 414/416.09; 221/25, 211; 29/740, 759, 33 M, 29/743; 156/584

(56) References Cited

U.S. PATENT DOCUMENTS

| | | | | |
|---|---|---|---|---|
| 4,393,579 | A * | 7/1983 | Van Hooreweder | 29/740 |
| 4,476,626 | A * | 10/1984 | Gumbert et al. | 29/740 |
| 4,586,670 | A * | 5/1986 | Vancelette et al. | 156/584 |
| 4,610,473 | A * | 9/1986 | Hawkswell | 294/64.1 |
| 4,794,689 | A * | 1/1989 | Seno et al. | 29/740 |
| 5,017,078 | A * | 5/1991 | Ingwersen et al. | 414/416.1 |
| 5,312,015 | A * | 5/1994 | Gelzer | 221/72 |
| 5,339,939 | A * | 8/1994 | Gueble et al. | 198/345.2 |
| 5,397,423 | A * | 3/1995 | Bantz et al. | 156/362 |
| 5,498,942 | A * | 3/1996 | Ijuin | 318/567 |
| 5,533,253 | A * | 7/1996 | Mifuji | 29/741 |
| 5,605,430 | A * | 2/1997 | Legrady | 414/412 |
| 5,810,170 | A * | 9/1998 | Alvite | 206/714 |
| 6,141,869 | A * | 11/2000 | Crane et al. | 29/842 |
| 6,631,868 | B2 * | 10/2003 | Miller et al. | 242/563 |

* cited by examiner

*Primary Examiner*—Thomas J. Brahan

(57) ABSTRACT

A novel feeder construction, and method of operation, for feeding components arranged in pockets in a carrier tape to a conventional pick-and-place machine. In a preferred embodiment, the carrier is fed in a line spaced laterally from the pickup location. The lead component when separated from the carrier must then be moved laterally to the pickup location. The invention includes a novel winder for the waste generated when the typical cover strip is removed from the carrier in order to remove its components. The invention also includes a vacuum nozzle construction that is capable of picking-up components such as pins and posts without altering the angular orientation of the component from the orientation it had while at the pickup location.

13 Claims, 7 Drawing Sheets

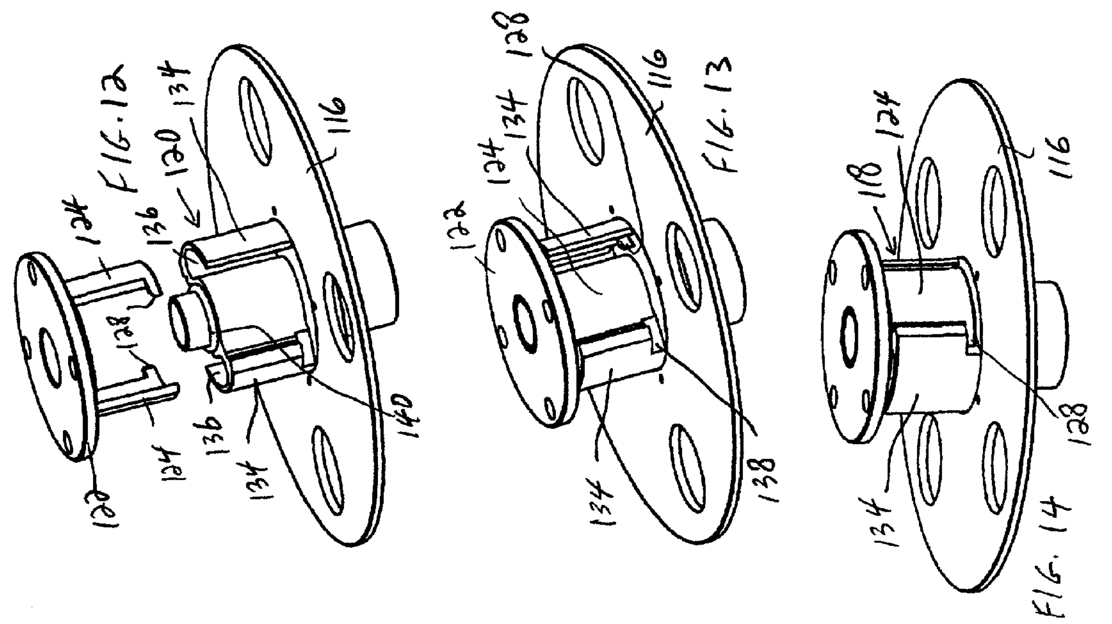
FIG. 12
FIG. 13
FIG. 14
116
118
120
122
124
128
134
136
138
140
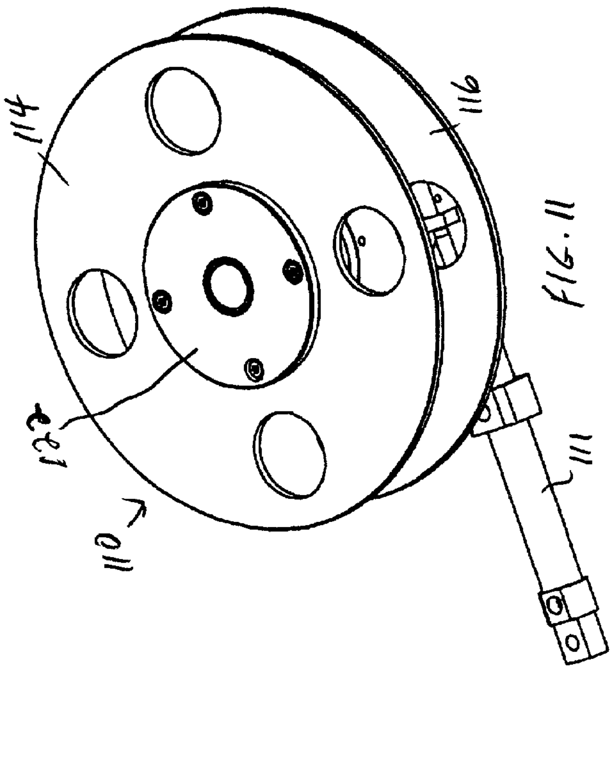
FIG. 11
110
111
114
116
123

AUTOMATIC FEEDER FOR CARRIER-SUPPORTED CONTACTS

RELATED APPLICATION

This application is a continuation-in-part of a commonly-assigned patent application Ser. No. 10/027,869, filed Dec. 20, 2001 now U.S. Pat. No. 6,691,859.

The invention is directed to an automatic feeder for carrier-supported electrical components and its method of operation, and in particular for supplying discrete components from a supply of components packaged in a continuous carrier tape for pickup by any one of conventional pick-and-place machines.

BACKGROUND OF INVENTION

Pick-and-place machines are well known and widely used in the populating of printed circuit boards or cards (PCBs) by components using surface mount technology (SMT). They offer the capability of precision in component placement, and speed in picking up a component from its source and placing it typically on a solder-paste covered pad on the PCB. Often the components are removed from small receptacles on a tape carrier. Components have been also supplied on a strip unreeled from a reel supplied to the PCB maker by the component supplier. U.S. Pat. No. 5,605,430 describes a feeder actuated by a pick-and-place machine for components connected to each other at their base to form a strip, which patent disclosure is hereby incorporated by reference. Our related commonly owned patent application Ser. No. 10/027,869, also describes a feeder for a pick-and-place machine for components connected to form a strip, which patent disclosure is also hereby incorporated by reference. With this strip of components such as pins or posts, the beveled end of the pin or post which is adapted to be picked up the conventional vacuum nozzle of a standard pick-and-place machine, after separation from its neighbor from the strip, is positioned at an appropriate pickup location with its base down and thus the beveled pickup end rises free of the base and free of adjacent components ready for pickup. However, neither of these references describes a feeder capable of separating a component from its receptacle on a carrier tape and placement of the separated component at the pickup location.

Moreover, when the base of the pin to be picked up is symmetrical, say round, with respect to its vertical axis, then the orientation of the base relative to the pad on which it is to be placed is unimportant. However, when the base is non-symmetrical, for example, non-round, then it may be desired that a particular axis of the base such as the long axis of the base is aligned with the long axis of the pad, or that the base have a specific orientation with respect to a square pad. Then it is important that the pin retain its orientation with respect to the nozzle when it is picked up. With conventional nozzles, this is not always possible, because air flow through small nozzles creates a natural vortex causing components being drawn into the nozzle to spin on their axis.

SUMMARY OF INVENTION

A principal object of the invention is an automatic feeder for components carried in respective receptacles on a carrier tape and placement of a separated component at the pickup location for pickup by a conventional pick-and-place machine.

A further object of the invention is a low cost high speed automatic feeder compatible with various pick-and-place machines and easily capable of feeding various diameters and lengths of components such as pins or posts to the pick-and-place machine.

Still another object of the invention is a method of removing components from pockets in a carrier tape containing components and making them available for pickup by a conventional pick-and-place machine.

Another object of the invention is an improved device to take up or wind tape, and in particular to a device for taking up or winding waste tape in the process of unreeling from a reel carrier-supported components, which device allows substantially the entire amount of wound up waste tape to be easily and efficiently removed from the waste reel.

Still a further object of the invention is a vacuum nozzle for a conventional pick-and- place machine capable of picking-up from a variety of sources a variety of components of various sizes and shapes.

These objects are achieved in accordance with one aspect of the invention by a novel feeder construction that is easily interfaced to a variety of conventional pick-and-place machines and can readily and reliably feed components carried in respective receptacles on a carrier tape for pickup by the pick-and-place machine. In a preferred embodiment, the carrier with its receptacle-carried components is fed along a path spaced laterally from the location where the separated component must be placed to be picked up by the descending pickup arm of the pick- and-place machine. The lead component when separated from its receptacle must then be moved laterally to the pickup location. By laterally spacing the carrier strip of components from the pickup location it is ensured that the feeder parts involved in separating the component from the carrier and carrying the separated component to the pickup location do not obstruct movement of the vacuum nozzle of the pick-and-place machine during the pickup operation nor advancement of the carrier to supply the next component.

In accordance with another feature of the invention, the machine comprises means for orienting the carrier tape after it is unreeled from its supplying reel such that the tape plane is essentially vertical and thus the components carried in their respective receptacles are similarly oriented. The tape carrier is provided with means for ejecting a component from its receptacle and moving it to the pickup location.

In accordance with another feature of the invention, the machine comprises means for separating a cover strip—that conventionally is used to hold the components in their respective receptacles while the carrier is being reeled up or transported—from the carrier and removing it in a relatively simple and inexpensive manner using a novel winder.

In accordance with still another feature of the invention, the conventional nozzle is provided with an adaptor that fits onto the nozzle and that incorporates the means for directing the flow of the vacuum-drawn air in the nozzle while the component is being picked up. This allows the use of a standard nozzle for minimizing costs, and also allows inexpensive adaptors to be provided for a variety of conventional pick-and-place machines.

In accordance with yet another aspect of the invention, a novel vacuum nozzle construction is provided that is capable of picking-up components such as pins and posts without altering the angular orientation of the component from the orientation it had while at the pickup location. In a preferred embodiment, the nozzle is provided with a distal portion having a component-receiving bore having an internal configuration that allows the component to be picked up to avoid the spinning effect.

The invention also includes the method of separating each component from its respective receptacle and moving it laterally to the pickup location.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

SUMMARY OF THE DRAWINGS

In the drawings:

FIG. 11 is a perspective view of the assembled winder of FIG. 10;

FIG. 12 is a partial perspective view of the completely disassembled winder of FIG. 11;

FIG. 13 is a partial perspective view of the partly assembled winder of FIG. 11;

FIG. 14 is a partial perspective view of the assembled winder of FIG. 11;

DETAILED DESCRIPTION OF PREFERRED EMBODIMENTS

Figure 1:
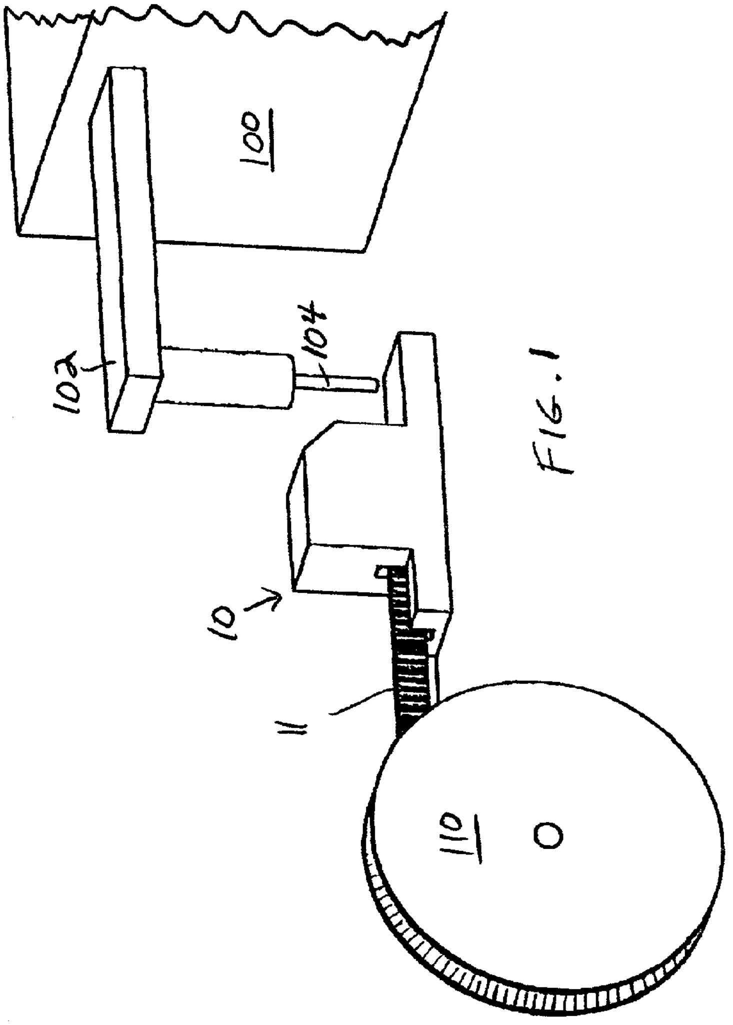
FIG. 1 is a partial simplified perspective view of one form of a feeder in accordance with the invention.

It will be understood that the feeder of the invention can be readily adapted to handle a wide variety of SMT components, including a wide variety of SMT pins and posts of different configurations, and thus the claims are not to be limited to the pins used to illustrate the invention in the preferred embodiments.

The invention of the present feeder is essentially based on the principles described at length and fully illustrated in the related copending parent application. While some of the drawings will be repeated here to assist the reader in fully understanding the invention, the focus will be on the differences between the feeder of this invention and that disclosed in the copending application. Both have in common that the feeder is a self-contained high-speed precision electropneumatic mechanical apparatus which presents discrete separated components, pins being used as an example, from a supply of pins from a common carrier to a pickup location for pickup by a vacuum nozzle of a surface-mount pick-and-place machine. The pins in the present invention are discrete, are homogenous, and are stamped from a continuous strip of material appropriate for the specific application, typically copper or a copper alloy. Several forms of such pins are sold by the assignee under the trademarked names MiniFoot surface mount pins and Treadhead pins. The feeder always holds or clamps the separated pin in the pickup location until the pick-and-place machine retrieves the pin, after which the feeder presents the next following pin from the carrier at the vacant pickup location. As in the parent application, the separated pin retainer is preferably comprised of a small V-block forming a clamping surface facing the pickup location and which block moves in a horizontal direction laterally to the pin and the carrier.

The pin retainer cooperates with a pin separator which in the present invention is used to eject a pin from its receptacle while the separated pin is simultaneously clamped to the V-block by the ejector.

More specifically, the components to be picked up are loose piece pins, preferably SMT pins, transported in a plastic carrier tape having vacuum formed cavities (pockets or receptacles) which hold and position the pins for subsequent removal by the pin separator which in this instance are ejector pins and the retainer V-block. The SMT pins are secured in the tape by means of a clear plastic cover tape which is bonded to the top and outer edges of the carrier tape. This is removed during the feeder cycle and wound up as waste by a novel winder for easy removal. The feeder is constructed in such a way as to position the axis of the component pins in a vertical attitude during transport by twisting the carrier tape 90 degrees from the horizontal position as stored on the reel. The pins remain loose within the pocket, allowing gravity to position the pins in the vertical direction so as to maintain the top of the pin at a consistent height. The ejector and V-block mechanisms are arranged to grip the pin securely before it fully leaves the pocket, thus providing a consistent pin height at the pickup location. As previously noted, the pickup location is offset laterally from the direction of transport of the carrier, similar to that of the parent application.

The design of the carrier pockets is generally universal for these types of pins and allows a range of component pins of different diameters and lengths to be packaged, transported, and ejected using a given carrier tape and pocket. That is, each pin does not necessarily require a separate and unique pocket and tape design.

The component pins are removed from the pocket by an ejector comprised of one or more pins of the feeder which extend and retract through one or more openings in the back of the carrier tape. The ejector pins push the component pin into the retainer comprised of the V-block mounted on a spring loaded pivoting arm. The V-block is initially positioned immediately adjacent to the surface of the carrier tape. At the completion of their travel stroke the ejector pins have positioned the separated component pin at the pickup location.

Depending on the application and the component pin, the orientation of the base of the pin can be up or down.

In the preferred embodiment, the retainer is a V-block and the ejector pins are flat (blunt) on the end. The retainer V-block is pivoted along its horizontal axis so as to allow it to align precisely with the vertical axis of the pin. It is also possible to have ejector pins with a V-shaped groove in the end and a retainer with a flat blade. The latter arrangement works well when the diameter of the component pin is small relative to the diameter of the ejector pins, thereby allowing the ejector pins to have a V-groove wide enough to securely capture the component pin.

Unlike the feeder mechanism of the parent application, no alignment pin that engages the carrier tape to provide alignment prior to ejecting the component pins is needed. Accurate positioning of the carrier tape is accomplished by the drive sprocket in accordance with a feature of the invention. The sprocket's teeth are rectangular in cross-section and are configured to form an interference fit in the conventional round sprocket holes of the carrier tape. The drive sprocket is carefully aligned during assembly of the feeder so as to ensure that the ejector pins do not contact the edges of the pocket holes in the carrier tape during ejection, which could cause a jam or misposition of the component pin.

The operation will become clearer from the detailed description that follows.

FIG. 1 is a schematic view illustrating a feeder 10 according to the invention positioned adjacent a pick-and-place machine 100 having a pickup arm 102 from which a vacuum-operated pickup nozzle 104 is suspended. In the operation of a conventional pick-and-place machine, under computer control, the arm 102 swings out from the machine, moves vertically downwards along a descending axis toward a component held in some fashion below the descending nozzle at a pickup location, engages and picks up by suction or other means the engaged component, and then returns to place the component on a computer-directed site on a PCB, after which a new cycle begins repeating the above steps. The function of the feeder 10 is to supply automatically a fresh component at the pickup location after the previous component has been picked up. The feeder of the invention is adapted for use with a variety of different pick-and-place machines supplied by different vendors. The machines typically have different operating cycles and thus, for maximum speed, it is desirable to be able to adjust the feeder operating cycle to be compatible with each of the different machines. In the feeder of the invention, this is readily obtained because, as will be explained in greater detail below, the feeder uses a micro-controller which can be programmed to control the timing of the sequence of steps that the feeder employs to carry out its functions. In addition, the feeder is not physically actuated by the pick-and-place machine nor is it connected to the normal feeder actuating mechanisms of the machine. The only connecting relationships are optical sensors in the feeder for detecting the arrival of the pickup nozzle and the positioning of the feeder such that the pickup location is aligned with the descending axis of the pickup nozzle.

Figure 2:
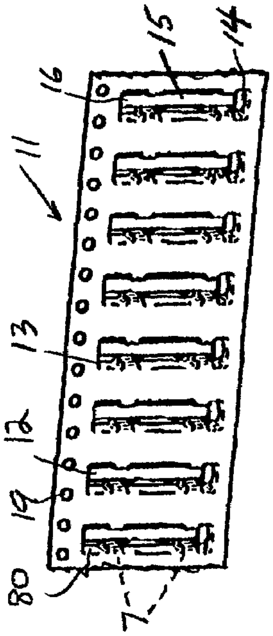
FIG. 2 is a partial perspective view of one form of a carrier strip of pocketed components that can be handled by the feeder in accordance with the invention.

The components are supplied in this case carried in pockets of a common continuous carrier 11 from a reel 110 holding a supply of the components. FIG. 2 illustrates a strip 11 of SMT pin-components 12 in spaced pockets 13 of the carrier 11. Each pin 12 comprises an elongated body having at its bottom a base 14 for surface mount on the PCB and having at its top a beveled end 16 (of reduced cross-section) which allows the pin to be readily removed from the carrier 11 by applying a pushing force transverse to the plane of the carrier. The carrier 11 is composed of a plastic tape with indexing holes 19. The vacuum nozzle 104 must pickup the pin by its beveled end 16 so that at the PCB it can be placed base-down 14 on the chosen site. Therefore, each pin 12 must be separated from the carrier 11 to free up its beveled end 16 before it can be picked up by the nozzle 104.

Figure 3:
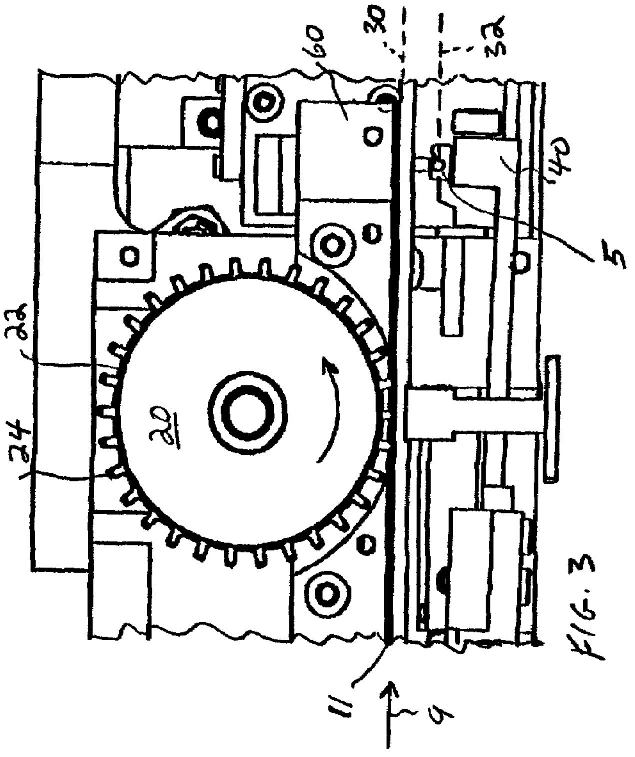
FIG. 3 is a top schematic view illustrating several principal elements of the feeder of FIG. 1 in their positions while separating a lead component from the carrier strip.

FIG. 3 is a partial assembly view from the top of one form of feeder 10 according to the invention, which comprises a strip advancing means 20, a component-retaining means 40, and a component-separating means 60 mounted on a suitable support (not shown). The basic operations of the machine are similar to that in the parent application. The strip 11 is shown advancing step-by-step in the direction of the arrow 9 (see also FIG. 4) by an indexing wheel 22 with protuberances 24 engaging the holes 19 in the carrier 11. The strip is advanced until the lead pin 15 reaches a position opposite the pin separator and retainer 40, 60 which have been positioned as shown on opposite sides of the strip 11.

From time-to-time, the term "far side" with respect to the carrier is used, by which is meant the side of the carrier plane furthest from the pickup location; in FIG. 3, the side above the strip 11. By "near side" when used is meant the side of the carrier plane nearest the pickup location; in FIG. 3, the side below the strip 11.

When the strip reaches the position shown in FIG. 3, under control of the controller, pin ejectors 62 on the part 60 on the far side of the strip move laterally 63 (downward in FIG. 4) toward the pickup location 5. Vertically-spaced holes 7 are provided on the back side of the carrier tape pockets 13. The holes 7 are vertically aligned with the pin ejectors 62 and are large enough to allow the pin ejectors 62 to pass through the hole into contact with the back side of the pin and push it forward directly into a V-shaped retainer block 42 that had initially been located opposite and closely adjacent to the lead pin. The retainer block is pivotable on a spring-loaded arm 44 which maintains the retainer block in its rest position closely adjacent to the lead pin.

As earlier mentioned, a transparent cover sheet 80 covers the carrier tape 11 preventing the components from falling out during transport or reeling. It will be appreciated from FIG. 1 that the reel 110 of components is typically held vertically so that the component strip when unreeled will extend in a horizontal plane. But the preferred feeder embodiment of the invention operates with the carrier strip 11 oriented in a vertical plane, so that, as the strip is unreeled, by means not shown, the strip is twisted 90° so that it enters the feeder as shown in FIG. 1 oriented in a vertical plane. The cover sheet 80 is removed before the lead pin 15 reaches the separator 60 so that the lead pin will not be obstructed when the ejector pins 62 push the pin from behind out of the pocket into the V-retainer where it is held by the pressure of the ejector pins. In this process, the pin moves laterally from its pocket 13 in the carrier 11, which is moving along a plane represented by the axis 30 in FIG. 3, to the pickup location 5 which is located along the plane represented by the axis 32 in FIG. 3. This action is similar to that of the parent application which includes moving the separator 60, which in its rest position on the far side of the carrier 11, toward the pickup location on the near side of the carrier plane during which its ejectors 62 move across the plane 30 pushing ahead of it the retainer arm 44 with the captured lead pin 15 held by the pin retainer 40 which moves horizontally, pivoting about a vertical axis located approximately at the line designated 45 in FIG. 6.

The lateral separation of the plane 30 of the advancing strip 11 from the pickup location 5 along the plane 32 is illustrated in FIG. 3. The pickup location 5 is aligned with the descending axis of the pickup nozzle 104.

Figures 5, 10:
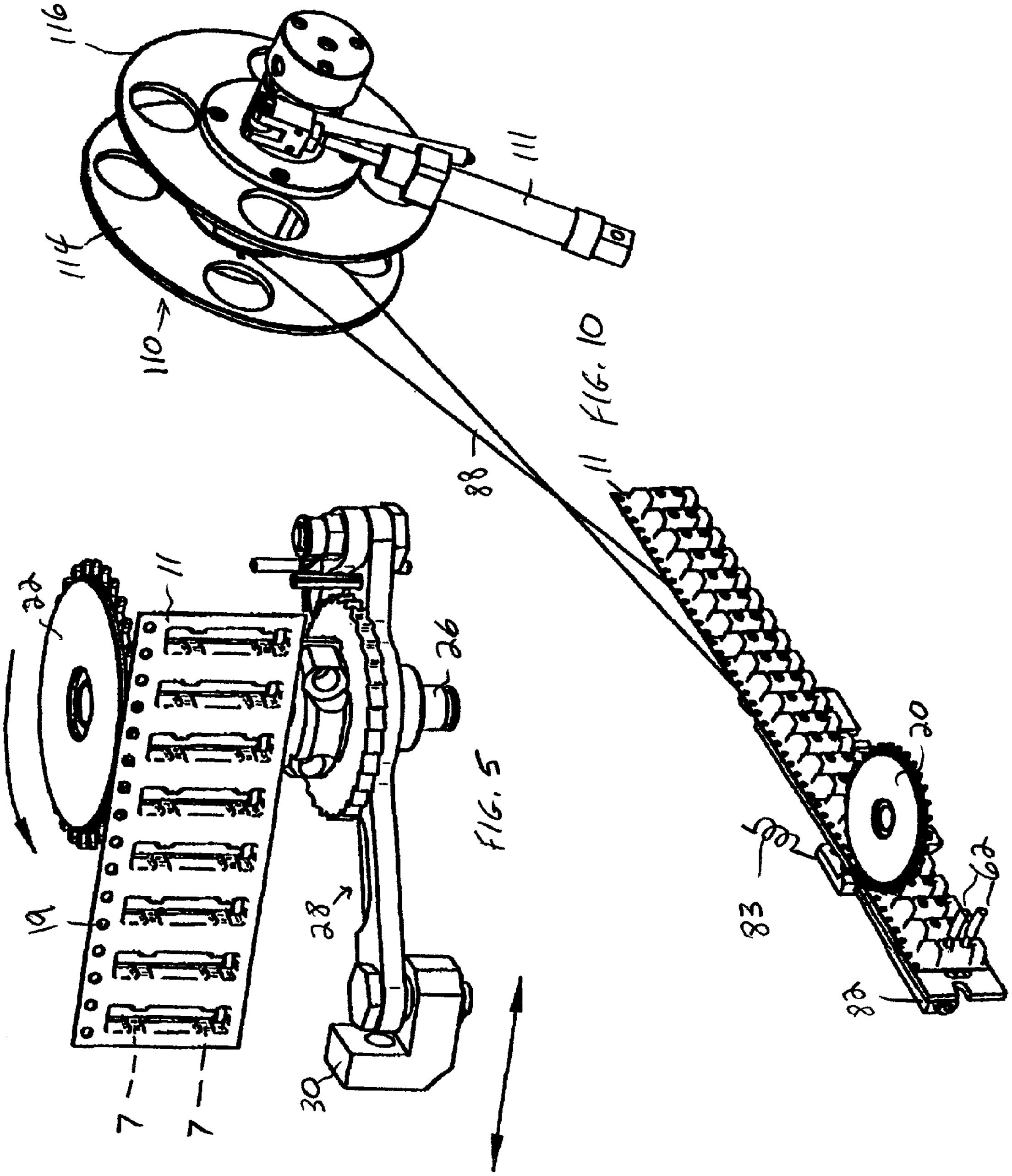
FIG. 5 illustrates schematically one form of indexing mechanism for advancing the component carrier strip in a feeder in accordance with the invention.

FIG. 5 illustrates one form of advancing means suitable for use in the feeder of the invention. It uses mechanical and pneumatic means, but it will be understood that the required action can be achieved by other well known means such as electrical or by any kind of timer or preferably under control of a controller (not shown). The action required is simply to rotate a vertical drive shaft 26 under control of a mechanical linkage and ratcheting device 28 activated by the stroke of a pneumatic cylinder (not shown) whose piston is connected to a small pivoting block 30 by means of a pin. Each time the pivoting block 30 is moved to the right in FIG. 5, the vertical shaft 26 rotates CCW, which in turn rotates CCW the indexing wheel 22 mounted on top and thus the strip 11 is advanced to the right one pitch distance (the center-to-center spacing of the strip holes 19). It is desirable that the carrier tape is accurately positioned during tape advancement to ensure that the ejector pins 62 line up with the ejector holes 7 in back of each pocket 19. This is achieved in a accordance with a feature of the invention by configuring each sprocket tooth 24 such that it physically interferes with the sprocket holes 19. Preferably, the sprocket teeth are made rectangular, for example, 0.040"×0.044", with the typically round sprocket hole 19 in the carrier tape about 0.059" in diameter. Alternatively, a loose fitting sprocket tooth (round or square) will also work, as it would always push against one side of the round hole and would therefore provide consistent positioning, so long as there is sufficient friction or drag on the tape to keep it from over-traveling. This is the usual case in virtually all conventional tape feeders.

Figures 4, 6, 7, 8:
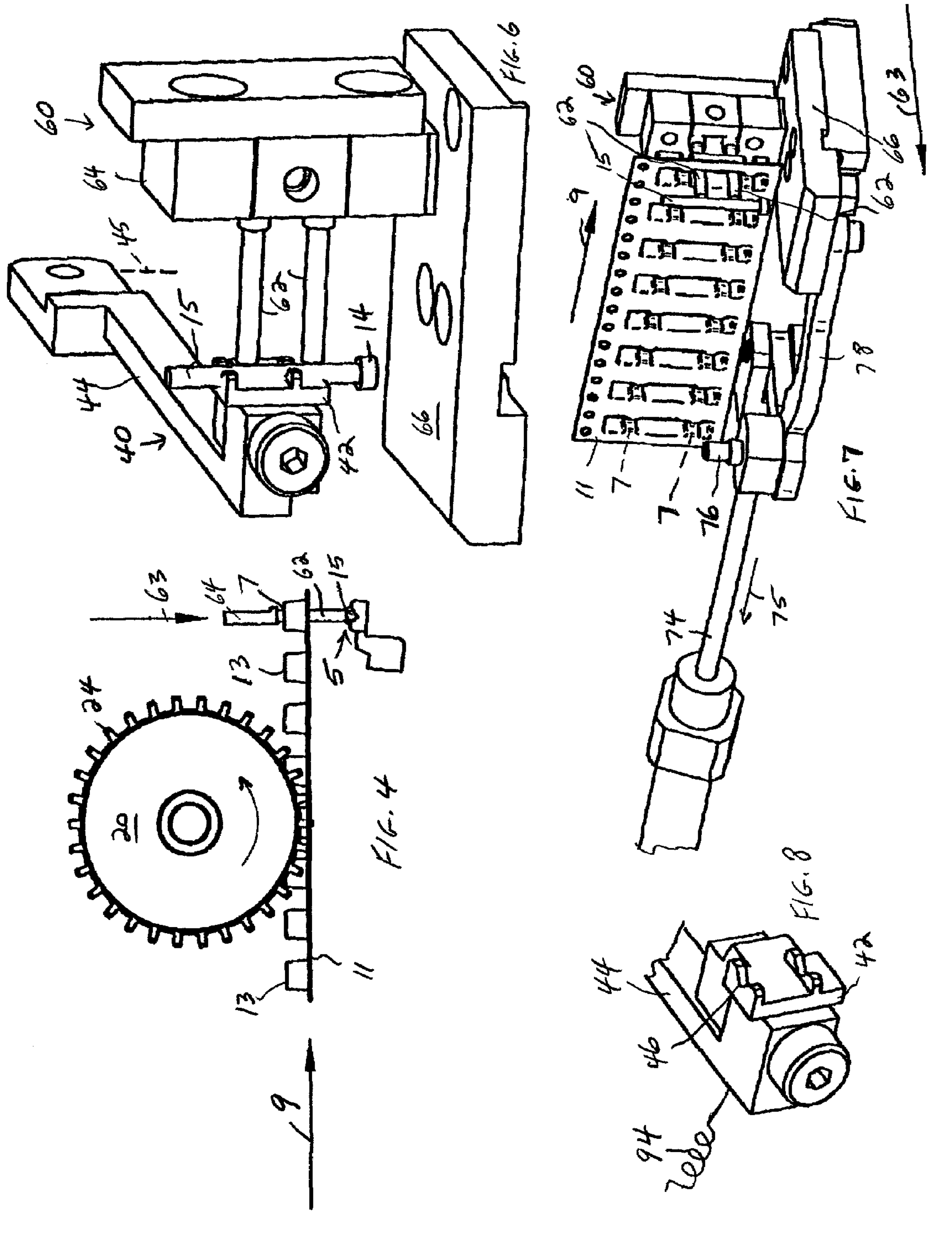
FIG. 4 is a top schematic view similar to FIG. 3 but simplified illustrating some of the same elements of the feeder of FIG. 1.
FIG. 6 illustrates schematically one form of component-separating mechanism for separating a component from the carrier strip and the retaining mechanism for the separated component for a feeder in accordance with the invention.
FIG. 7 is a perspective view from the front of the mechanism of FIG. 6 showing some of the activating mechanism.
FIG. 8 is an enlarged view from the front of the pin retainer shown in FIG. 6.

FIGS. 6–8 illustrate one form of the pin separator 60 and pin retainer 40 assembly of the invention. The pin separator 60 comprises a support 64 block mounted in any suitable manner on a movable block 66. The separator comprises an activator (described below) which upon a signal from, say, a controller, moves the entire block 66 with the extended ejector arms 62 laterally in the direction of the arrow 63 (FIG. 4) pushing the lead pin 15 into the V-block 42 and retains it in that position. An enlarged view of the V-block 42 is shown in FIG. 8. The view in FIG. 7 is with the retainer 40 omitted to show the two ejector pins 62 in their position passing through the holes 7 at the rear of the pocket 13 after the support block 66 has moved from its rest position with the ejector pins on the far side of the carrier 11 laterally (downward in FIG. 4) to its ejected position when its pins 62 pass through the tape holes 7. FIG. 7 by way of example shows one way of actuating the pin separator, comprising a pneumatic cylinder (not shown) whose piston is connected to a shaft 74 which is moved in the direction shown by the arrow 75. The shaft is connected to a lever 78 which pivots about the axis of pin 76. The other end of the lever has a slider block attached to it (not shown) which fits into a slot in the bottom of support block 66 so that the pin separator 60 can be moved in both directions (in the direction 63 and in the reverse direction). A urethane pad (not shown) controls the lateral position of the block 66 in the direction indicated by arrow 63. As before, the cylinder is actuated by a suitable controller to function as will be described below in greater detail.

The separator block 66 cooperates with the pin retainer 40. When the block 66 is advanced toward the pickup location (5 in FIG. 4), it pushes the pin retainer 40 in the same direction. The block 66 is positioned below the carrier tape 11 so that the latter does not interfere with the movements of the separator. Similarly, when the separator block 66 is moved in the opposite direction (to its rest position), then the pin retainer 40 which is spring loaded returns to its rest position with its clamping surface 46 formed by the vertically-spaced V-grooves separated by a recess adjacent the near side of the strip 11. The geometry is such that the spring loaded retainer applies enough of a retaining force on the pin clamped between the clamping surface 46 and the flat ends of the two spaced pin ejectors 62 to maintain it suspended along the descending axis of the pickup nozzle which represents the pickup location 5. The spring 94 which maintains the clamping pressure is shown schematically in FIG. 8.

Figure 9:
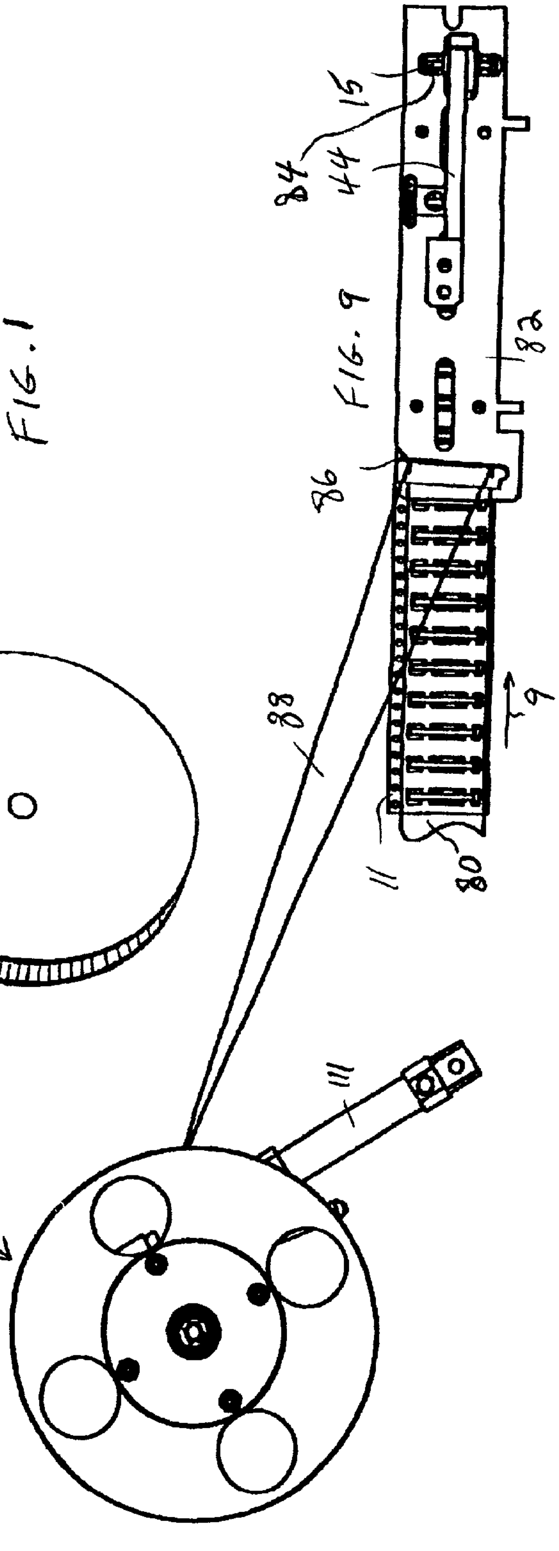
FIGS. 9 and 10 are front and rear perspective views of one form of a feeder in accordance with the invention showing the winder feature of the invention.

As indicated above, a further feature of the invention is a novel cover tape remover and winder which greatly simplifies the collection and removal of the separated cover tape 80. FIGS. 9–14 illustrate this feature of the invention. As shown in FIG. 9, in order to allow the lead pin to be ejected from its pocket, the cover tape 80 which covers the pockets must be removed without allowing the components to fall out of their pockets before ejection. This is achieved by providing a spring-loaded metal retainer plate 82 located closely adjacent to the near side of the carrier 11. For clarity, the spring is shown schematically at 83 in FIG. 10. The retainer plate 82, which is not shown in the previous views for clarity, contains a forward slot 84 allowing the retainer arm 44 to receive the ejected pin and to carry out unimpeded its lateral movements. The retainer plate also contains a rear slit 86 through which a section 88 of the cover tape 80 is passed, twisted 90° and attached to the winder spool of one form of the tape winder 110 of the invention. As the carrier 11 advances, the separation of the cover tape 88 from the carrier tape 11 occurs at the point where the cover tape 88 is pulled through the slit 86 in the metal retainer plate which is spring loaded against the flat surface of the tape. This plate retains the pins in the pockets after the cover tape has been removed and the slot 84 provides an opening to allow the pin to be ejected at the point where the pin is removed from the tape to be positioned for pick up. The retainer plate 82 covers the exposed pockets and prevents the free components in their respective pockets from falling out. The winder 110 is activated by an indexing mechanism 111 under the control of the PLC explained in greater detail below. The winder is thus rotated at the same rate as the advancing tape to maintain the tension in the removed tape 88.

The winder itself comprises opposed outer disc 114 and inner disc 116. The inner disc 116 is permanently attached to its indexer 111. The outer disc 114 is removable. Inside is a spool 118 which receives the waste tape 88 and comprises an inner spool portion 120 attached to the inner disc 116, and an outer spool portion 122 attached to the outer disc 114. The outer spool portion 122 is shown integral with the outer disc 114 in the assembly view of FIG. 11. In FIGS. 12–14, the outer disc 114 has been omitted so that the inner construction and operation becomes visible.

Prior art winders on feeders require manual unwinding of the waste tape from the winder spool after all of the components have been used or the winder becomes full. This is typically accomplished by removing the outer disk of the winder mechanism and then pulling off the wound up tape from the winder spool by hand. The result is a bulky pile of waste tape which must be gathered by hand and discarded. This is a messy, laborious and time consuming task.

The invention overcomes these problems by a construction that causes the effective diameter of the spool 118 to reduce 120 when the outer disc 114 with its attached outer disc 122 has been removed, with the result that the roll of waste tape is easily removed as one piece. As shown in FIG. 12, the outer spool portion 122 has two facing part-cylindrical portions 124 which terminate at their ends in circumferentially-extending fingers 128. The inner spool portion 120 has two curved arms 134 whose outer surfaces form part of a cylindrical surface which define inner cavities 136 configured to receive the two part-cylindrical portions 124 when the outer spool 122 is mounted to the inner spool 120 as shown in FIG. 13. If now the outer disc 114 with attached outer spool 122 is rotated CW, as shown in FIG. 14, the fingers 128 engage slots 138 in the cylindrical surfaces 134. In this assembled configuration, a hub 118 is defined by the nearly cylindrical surface formed by the cylindrical surfaces 134 on the inner spool and the slightly smaller in OD cylindrical surfaces 124 on the outer spool. The free end of the cover tape leader conventionally provided on a new component spool can be placed between the two inter- fitting cylindrical sections 134, 124 to attach the leader to the thus-formed hub 118 prior to starting the winding process. A friction fit can be used to lock the assembled outer spool portion 122 to the receiving inner spool portion 122 when assembled, but it is preferred to provide an O-ring 140 (FIG. 12) over a smaller diameter inner hub which during the CW rotation is compressed to provide the friction fit and locking action.

During the waste tape winding process, the flexible tape 88 under tension contacts both outer cylindrical surfaces of the parts 124, 134 making up the spool hub 118. When it is desired to remove the coil of waste tape, the outer disc 110 is rotated CCW to its fullest extent and then pulled off of the fixed inner disc 116. The inner hub 118 about which the tape wound is now lacking the surfaces of the part 124 of the outer spool portion 122, with the result that the hub shape becomes somewhat elliptical which essentially reduces the effective hub diameter causing the wound tape to loosen on the reduced diameter hub now made up only of the surfaces of the inner spool 134 and thus the entire coil of waste tape is easily removed from the inner spool 120. The crux of the invention is a hub for the wound waste tape constructed from two inter-fitting parts, one with slightly larger cylindrical surfaces and the other being removable and with slightly smaller cylindrical surfaces such that the OD for receiving the wound tape is slightly larger when the two parts are assembled than when apart. It will be clear to those skilled in this art that other configurations that would function similarly can be substituted for those described above.

Figure 15:
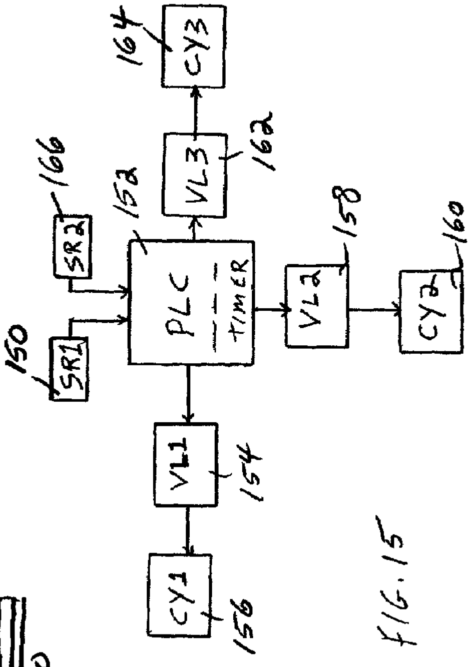
FIG. 15 is a schematic block diagram illustrating one form of activation mechanism of a feeder according to the invention.

The sequence of events to effect the desired operation of the feeder of the invention is as follows, taken in connection with FIG. 15 which shows schematically in block form the active parts that are actually integral with the feeder. The actual layout is somewhat similar to that shown in FIG. 14 of the parent application.

As the vacuum pick-up nozzle 104 of the machine descends vertically, when it reaches the pickup location for the purpose of retrieving the lead SMT pin 15, a first electronic sensor 150 integral to the feeder, appropriately positioned, detects the presence of the nozzle 104 and initiates a first release cycle including a predetermined time delay controlled by a PLC programmable logic controller 152 integral to the feeder so as to release the pin 15 from its holding means when the nozzle has descended an appropriate distance onto the beveled pin end.

1. The first event of the component release sequence is the energizing of a first solenoid- operated pneumatic valve 154 which is connected to pressurize a first pneumatic cylinder 156 causing the retaining lever 44 with V block 42 to swing away from the ejector pins 62 and the pin 15 (FIG. 15).

2. The next event of the release sequence is the energizing of a second solenoid-operated pneumatic valve 158 which is connected to pressurize a second pneumatic cylinder 160 connected by a mechanical linkage to the ejector pins support block 66, which action causes the block 66 with the ejector pins 62 to withdraw in a horizontal direction laterally to the pin and the carrier tape and toward the carrier tape 11 until clear of the carrier transport path (along the axis 30—FIG. 3). The pin 15 is now engaged and constrained by the pickup nozzle 104.

As the nozzle 104 rises after thus retrieving the lead pin 15, the first sensor 150 changes state upon ceasing detection of the nozzle and initiates a pin-ejector second cycle which includes a second sequence of events controlled by the PLC 152 to immediately present another pin to the pickup location.

3. The first event in this second sequence is the de-energizing of the first valve 154, causing the retaining lever 40 with V-block 42 to return to its starting position adjacent to the near side plane of the carrier tape 11 containing the loose piece pins.

4. The second event in this sequence is the energizing of a third pneumatic valve 162 which pressurizes a third cylinder 164 connected by another mechanical linkage and the ratcheting device 28 attached to the vertical drive shaft 26 (FIG. 5). The indexing wheel 20 advances the carrier tape 11 the required predetermined distance to place the next lead pin in position for ejection. A second electronic sensor 166 detects the completed stroke of this third cylinder 164, causing the de-energizing of the second pneumatic valve 158, which, being a 4-way valve, pressurizes the second cylinder 160 which causes the pin ejecting means, i.e., the ejector pins 62, to push the pin 15 out of the pocket 13 of the carrier tape and into the V block 42 attached to the retaining lever 40, so as to position the held pin at the pick-up location. Retraction of the third cylinder '164 patent resets the respective aforementioned linkage to its normal position. All actions of the second cycle are now complete and the pin sits in its V-block at the pickup location 5 awaiting the arriving vacuum nozzle 104 and the start of the first cycle.

The significant features of this unusual procedure are (a) location and orientation (90 degree twist) of the carrier tape 11 containing the loose piece suspended pins in a plane (along the axis 30) laterally offset from the pickup location (along the axis 32); (b) lateral movement (advancement) of the pin ejecting members 62, 66 with the ejected lead pin from the offset plane of the carrier tape toward the pickup location; (c) lateral movement (withdrawal) of the pin ejector members 62, 66 without the pin from the pickup location toward the offset plane of the carrier tape to retrieve a new pin; (d) orientation of the pin axis perpendicular to the edges of the carrier tape 11 instead of perpendicular to the surface of the carrier tape. This lateral withdrawal movement away from the pickup location after the vacuum nozzle has engaged the pin is to restore the pre-ejection position of the pin ejecting members on the far side of the carrier, which is necessary to ensure that the pin-ejecting members will be clear of the advancing carrier tape containing the next following pin. The PLC controller can be programmed in a straight-forward manner to carry out the foregoing sequence of events and such that the carrier is not advanced until after the pre-ejection positions are attained as indicated, if necessary, by a third electronic sensor (not shown). The offset position of the carrier tape containing loose piece pins is necessary because the pin must be removed from the carrier tape so that its free end, opposite to the base, can be engaged by the vacuum nozzle.

During the second sequence of events controlled by the PLC, which events are initiated as the nozzle rises after retrieving the pin and the first sensor ceases detection of the nozzle, a time point arises when the second pneumatic valve 158 actuates (de-energizes) so as to de-pressurize the second cylinder 160 causing the ejecting means to push the pin out of the pocket of the carrier tape and into the V-block. Note that this action can conveniently be used to pressurize the winder cylinder 111 which extends and merely resets spring pressure that maintains the winder under pressure. The winder tension spring (not shown) actually provides the force that turns the winder 110 and removes the cover tape. This allows tension to be applied to the cover tape 88 by the winder during the portion of the cycle that the carrier tape is advanced, since at that time the ejector cylinder 160 is withdrawn and therefore the winder cylinder is no longer pressurized. Alternatively, the winder cylinder 111 could also be connected to the pressure line which causes the ratchet cylinder 156 to reset after advancing. In this case the winder cylinder would be depressurized during the advance stroke of the ratchet cylinder 156. Other functionally equivalent activation schemes will readily occur to those skilled in this art.

In the preferred embodiment, the controller is programmed so that the time delay that occurs between the time that the first cylinder 156 is actuated to swing the spring-loaded lever 40 away from the pin to release it and the time that the V-block starts to withdraw from the pickup location is sufficient so that when the nozzle 104 rises with the captured pin, the ascending pin voyage is not interfered with. For example, the base 15 of the MiniFoot pins extends in several directions so care must be exercised that those extensions do not strike any feeder parts during their ascent. The appropriate timing of these steps avoids that problem, and is easily controlled by the appropriate timing programmed into the controller, as those skilled in this art will readily appreciate. Most commercial controllers allow the user to program numbers representing times into particular registers, and the controller as it executes its program knows to access certain registers to determine the timing of the outputting of control pulses from selected controller outputs connected to the different electronic valves described, which are also available commercially. As previously mentioned, other controllable devices such as electrical solenoids and others can also be substituted for the pneumatic actuating devices described. The use of this programmable controller thus makes it easy to customize the feeder to the particular pick-and- place machine used by the PCB maker.

The electronic sensors employed can be of various known kinds. Preferably, convergent optical sensors are employed which combine an LED as IR beam generator and a phototransistor as the beam detector. The first sensor, which is of this kind, thus has its beam always ON being detected. The arrival of the nozzle interrupts the beam signaling its arrival. When the nozzle departs, the detection of the beam signals its departure. Other kinds of sensors to perform the same functions can easily be substituted for that and the other sensors.

It is noted that one of the advantages of using reel-supplied components is that it provides much higher quantities of parts per reel for components, especially for those having a long axis, which parts must be placed on the board with the axis perpendicular to the board. The feeder of the invention works well with such reel-supplied parts because of the feature of using the physical interference of the rectangular sprocket tooth with the round drive sprocket hole in the carrier tape. This assists in providing accurate component positioning during tape advancement. Also, even though the parts must be placed on the board with the axis perpendicular to the board yet are supplied on an inexpensive carrier with the component long axis packaged parallel to the plane of the carrier, the feeder still works satisfactorily because the long axis of the component is perpendicular to the edges of the carrier tape, and not to the surface of the tape as is the conventional practice, and the feeder re-positions the carrier tape so that the long axis of the pin is perpendicular to the board prior to pick up. And with such a carrier, the net "thickness" of the component in carrier pocket is much smaller than if the axis were perpendicular to the plane of the tape, thus allowing more linear footage of tape per reel, and in addition much longer parts can be packaged in tape this way, since the conventional way is limited by how deeply the pocket can be drawn in the plastic material during manufacturing. Also, components other than pins, e.g., surface mount tabs or spade connectors, can also be economically packaged this way and properly supplied to the pick-and-place machine pickup nozzle with only minor variations to the feeder and nozzle to accommodate such components.

The feeder of the invention can be equipped with a selector switch which allows easy set up for tapes having components packaged on 4 mm, 8 mm or 12 mm centers, pocket to pocket. This is unique, in that the feeder advances the tape with an air cylinder and ratchet mechanism in the preferred embodiment of 4 mm per stroke cycle. Hence, 8 mm simply requires a double stroke, and 12 mm a triple stroke. Electric feeders, which operate with stepper or servo motors, can also be substituted if desired. For each feed stroke length requirement, a related sequence within the PLC is utilized. Essentially, this causes the ejector pins to wait until the tape has advanced the specified distance before moving to eject the pin from the pocket. Otherwise the ejector pins might jam against the carrier tape where there are no openings and the feeder would jam.

It will also be understood that the inventive feeder is not limited to the specific components shown. Also, different shapes of the components are also considered within the scope of the invention so long as the shape allows for an end for pickup, which can be pointed as in a pin, or flat providing a area surface that allows vacuum pickup.

The vacuum nozzle feature of the invention is especially adapted for picking up a large variety of components either by receiving in an internal bore an upwardly projecting part of the component or by the usual way of attaching to the surface of a conventional flat surface mount component. Pin examples are described and illustrated in U.S. Pat. No. 5,451,174, whose contents are hereby incorporated by reference. FIG. 12 of that patent illustrates a carrier strip 75 having a pin 80 attached. The carrier is shown positioned below the pin for those instances where the pin beveled end, when separated from the carrier, is to be inserted into a hole in a substrate. For SMT components, however, where the base is to be placed on a pad, as illustrated in FIG. 11, and the vacuum nozzle pickup member of the pick-and-place machine will engage the beveled pin end from the top to pick it up, it is preferred that the carrier position is inverted so that the pins are suspended from the carrier positioned above them. It will be understood that the vacuum nozzle of the invention can also be readily adapted to handle a wide variety of SMT components, and a wide variety of SMT pins and posts of different configurations, and thus the claims are not to be limited to the pins specifically illustrated in the '174 patent or used to illustrate the invention in the specific embodiment.

Figure 16:
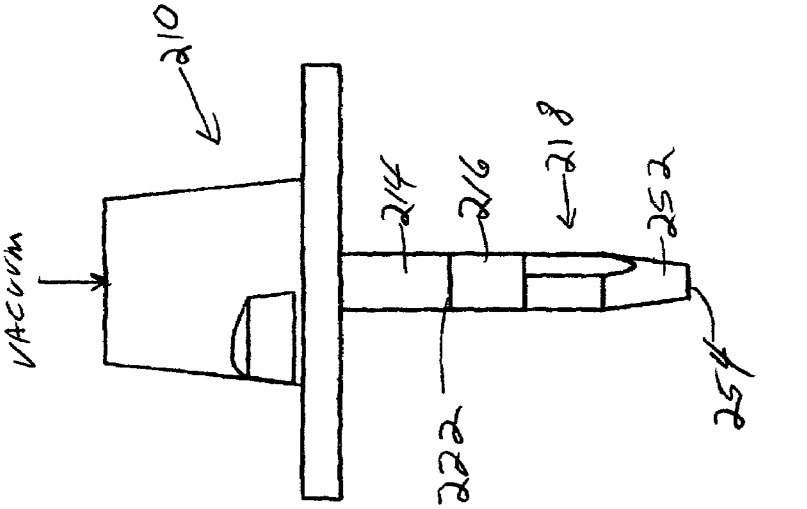
FIG. 16 is a partial simplified side view of part of one form of a vacuum nozzle that can be used with the feeder in accordance with the invention.
Figure 17:
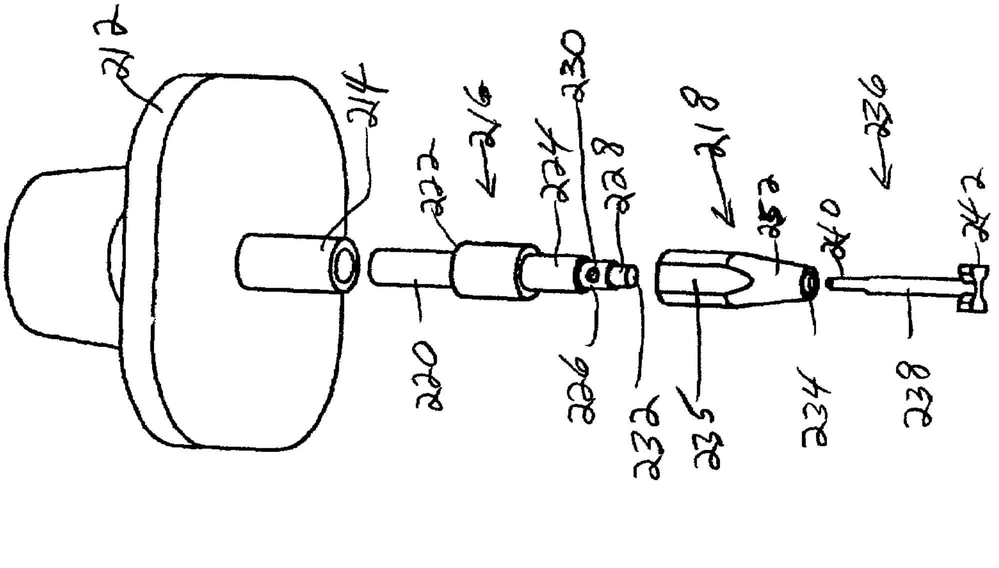
FIG. 17 is a partial perspective exploded view of the vacuum nozzle of FIG. 16 shown with a pin about to be picked-up.

One form of the vacuum nozzle according to the invention is illustrated in FIG. 16 and is for SMT stamped pins. Only the nozzle end of the pick-and-place machine is illustrated. A typical pick-and-place machine is a self-contained high-speed computer controlled apparatus having a pickup arm from which a vacuum-operated pickup nozzle 210 is suspended. The arm is controlled to cause the vacuum nozzle to descend to a pickup location which presents discrete separated SMT pins from a supply of pins. The discrete picked up pin is then transported typically to a PCB on a computer controlled x-y base which allows the arm with the pin held, base down, in the vacuum nozzle to descend allowing the pin base to seat on a solder paste coated chosen pad. Vacuum is supplied by the machine to the vacuum nozzle 210. The original vacuum nozzle 212, which could have been part of a standard pick-and-place machine, is shown in FIG. 17 and has been slightly modified, in particular by removing a portion of a descending part 214 to shorten it so that when the adaptor of the invention is added, the overall length will be similar to that of the original unmodified nozzle.

The parts representing the adaptor added by the invention include an intermediate part 216 and a lower part 218, both coaxially aligned with the descending part 214. From time-to- time, the part closest to the nozzle arm, in this case the part 216, may be referred to as the proximal part, meaning proximal with respect to the pick-and-place machine arm; and the part furthest from the nozzle arm, in this case the part 218, may be referred to as the distal part. The intermediate part 216 comprises an upper section 220 that is configured to attach to the descending part 214. Preferably, the upper section 220 is a hollow tube with an outer diameter (OD) that allows it to engage in a slip fit the bore of the descending part 214 to which it can then be permanently bonded with a suitable adhesive. The tube 220 will engage up to a shoulder 222 of a larger diameter middle portion, which then extends down to a smaller diameter lower portion 224 which terminates in a first reduced diameter section 226 followed by a second reduced diameter section 228. The first reduced diameter section 226 has at least one hole 230 that lead to its internal bore. The second reduced diameter section 228 terminates in a solid flat end 232. The lower part 218 has an interior bore (not shown in FIG. 17) that extends completely through to its bottom surface 234. The item 235 is merely a flat used for handling or positioning. Below the adaptor is seen a typical pin 236 to be picked up, with the pin having an upwardly-extending body portion 238 terminating on top with a beveled end 240, and terminating on bottom with a bowtie shaped base 242 having a long axis in the plane of the drawing and a short axis perpendicular thereto.

The pin body portion 238 can be round or non-round, but the invention is particularly important for use with non-round pins, having a square or rectangular cross-section. In the latter case, the bore in the lower part 218 is given a complementary shape, by which is meant that it has an internal profile that substantially matches that of the non-round pin. So, for example, if the pin body is square in cross-section, the internal bore would also be square but slightly larger, so that it can accommodate the square pin body and prevent its rotation. Similarly, if the pin body is rectangular in cross-section, the internal bore would also be rectangular but slightly larger, so that it can accommodate the rectangular pin body and prevent its rotation.

The pin when removed from its carrier or other housing is oriented in a predetermined position at the pickup location of the feeder. It is important in many cases that that predetermined orientation is maintained when the pin base is finally placed on the PCB pad. Therefore, it is important that the pin, when drawn by the vacuum into the receiving bore of the lower part 218, does not spin or rotate. Once in the latter, its orientation is maintained by the configured or profiled bore of the lower part 218.

Figure 19:
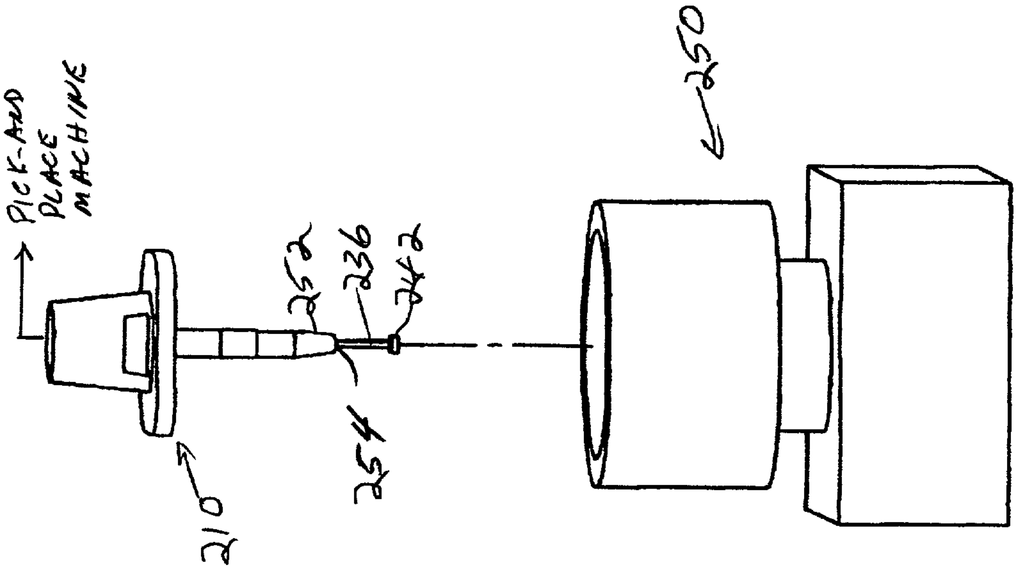
FIG. 19 is a partial schematic view illustrating a conventional optical detector of the pick- and-place machine sighting on the picked-up pin being carried by the vacuum nozzle of FIG. 16.
Figure 18:
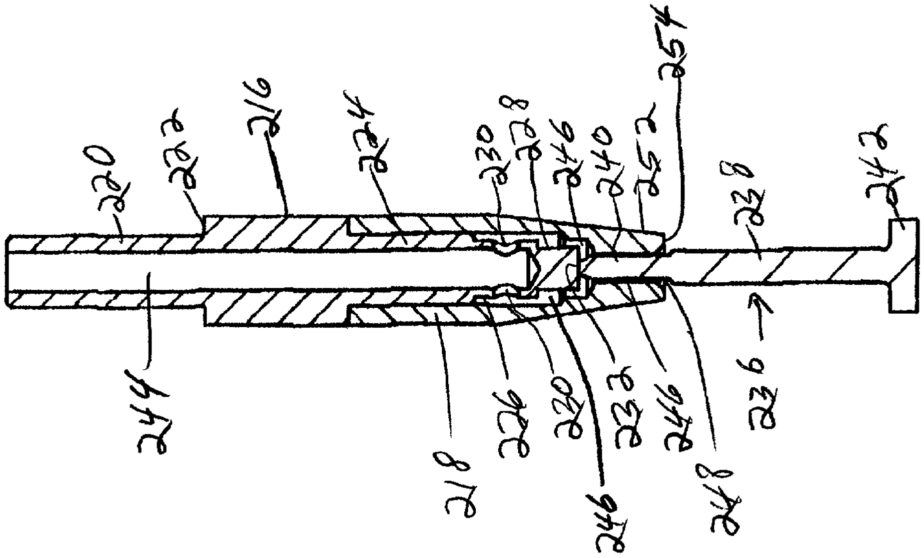
FIG. 18 is an axial cross-sectional view of part of the vacuum nozzle of FIG. 16 showing how the pin of FIG. 2 is picked up.

For the added adaptor to operate as described, its parts require an internal rearrangement. The cross-section of FIG. 18 will illustrate this more clearly. The intermediate part 216 has a bore 244 running vertically through it but closed off at the bottom by the flat end 232 of the second reduced diameter section 228. In a preferred embodiment, the cross-holes 230 extend laterally and allow the vacuum to extend into the wider and then the narrower receiving reconfigured bore 246 of the lower part 218 from which it becomes active via the opening 248 at the bottom to retrieve the pin 236 without spinning. By preventing this, the component is reliably located by the vision centering process of the pick-and-place machine, illustrated schematically in FIG. 19 by the optics represented by the object 250. Without this feature, a high percentage of SMT pins of this type are not recognized by the vision centering process because their rotational position is beyond the range of the vision system. Such components have to be discarded. What also assists in the recognition process is the tapering of the lower end of the lower part 218, indicated by numeral 252. Preferably, the bottom 254, which preferably is also flat, of that lower part 218 has a smaller footprint in at least one axis than that of the pin base 242, as the vision centering process tends to sight on the largest area visible in its field of view in locating for the computer the pin's position.

Summarizing, the lower tip of the adaptor with at least one cross hole and with an internal profile to fit over SMT pins having a non-round cross-section, prevents the component from spinning around its vertical axis when being drawn into the nozzle by vacuum during pickup. The closed-off section 228 at the bottom provides a flat surface 232 against which the tip of the SMT pin is stopped when drawn into the nozzle (see FIG. 18). This flat surface prevents the tip of the component from wedging as might occur with a more conventional straight through hole, or one having a counter bore or countersink to stop the component. Such a wedging condition could result in the component not being released from the nozzle during placement. The through-hole or cross-holes 230 intersects with a bore running down from the top to provide vacuum at the lower tip opening 248. The adaptor can be retrofitted to standard nozzles to provide the benefits described above.

This nozzle can also be used to pickup other conventional flat surface mount components because it is flat on the end 254. That is, it need not be used exclusively to pickup non-round surface mount pins.

The lower part 218 can be mounted on the part 224 in the same manner as that of the latter on the part 214 of the original nozzle, i.e., by a slip fit and a bonding adhesive.

Other modes of mounting could obviously be substituted. The internal profile of the bore 246 of the lower part 218 should be complementary with that of the pin cross-section being picked up. With a round pin, no such profile is required.

It will also be understood that the invention is not limited to the specific components shown. Also, different shapes of the components are also considered within the scope of the invention so long as the shape allows for an end for pickup, which can be pointed as in a pin, or flat providing an area surface that allows vacuum pickup. The different shapes also be a blade as in a tab type of connector. In this instance, the distal part of the nozzle would have a slit perpendicular to is long axis so as to fit over the end of the tab and keep it rotationally oriented.

Where the claims refer to the "first" or "second" paths, this is meant to refer, respectively, to the transport path followed by the strip of components, and the transverse path followed by the component-separating means and component-retaining means.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. In combination:

a) a pick-and-place machine having a pickup member, said pickup member comprising:

i) a vacuum nozzle adapted to pickup components without altering their angular orientation, comprising a proximal part, a distal part having a receiving bore for attachment to the component during pickup, the proximal part having an internal bore for receiving vacuum, means for transferring the vacuum in the bore of the proximal part to the bore of the distal part, the distal part being configured to avoid rotating the picked up component;

b) a feeder for individually dispensing components from a carrier tape containing in pockets loose piece components for pickup by the pick-up member, the carrier tape comprising a cover tape covering the pockets, the pick-and-place machine sending its pickup member to a pickup location on the feeder and the pickup member carrying a component returning to the pick and place machine, comprising:

A) means for feeding the carrier tape along a first path,

B) at least one component ejecting member positioned at a first position spaced from the pickup location, C) first means for moving the component ejecting member from its first position along a second path to a second position at the pickup location, said means for moving including means for ejecting a lead component from its pocket on the carrier and moving the ejected component to the pickup location, D) second means for retaining the lead component at the pickup location awaiting arrival of the pickup member, E) means for sensing the arrival of the pickup member, F) means in response to sensing the arrival of the pickup member for:

(i) releasing the lead component currently held at the pickup location allowing the released component to be picked up by the arriving pickup member, (ii) returning the component ejecting member to its first position, (iii) advancing the carrier tape to provide a new lead component;

c) a winder for winding up the removed cover tape, the winder comprising first and second separable means forming a hub for receiving the removed cover tape, said first and second separable means when assembled forming a hub having a given diameter and when disassembled forming a hub that is smaller than said given diameter whereby a spool of removed cover tape formed on the given diameter hub is easily removed from the smaller hub formed when the first and second separable means are disassembled.

2. A feeder for individually dispensing surface-mount components from a carrier tape containing in pockets loose piece components for pickup by a pick-up member on a pick-and-place machine, the pick-and-place machine sending its pickup member to a pickup location on the feeder and the pickup member carrying a component returning to the pick and place machine, comprising:

A) means for feeding the carrier tape along a first path,

B) at least one component ejecting member positioned at a first position spaced from the pickup location, C) first means for moving the component ejecting member from its first position along a second path to a second position at the pickup location, said means for moving including means for ejecting a lead component from its pocket on the carrier and moving the ejected component to the pickup location, D) second means for retaining the lead component at the pickup location awaiting arrival of the pickup member, E) means for sensing the arrival of the pickup member, F) means in response to sensing the arrival of the pickup member for:

(i) releasing the lead component currently held at the pickup location allowing the released component to be picked up by the arriving pickup member, (ii) returning the component ejecting member to its first position, (iii) advancing the carrier tape to provide a new lead component, G) the pickup location being laterally spaced from the first path, and the second path being transverse to the first path, H) the carrier tape having an elongated length dimension and a shorter width dimension defining major opposed sides, the carrier tape being oriented with its major opposed sides extending vertically as it traverses the first path, the carrier tape having a near side closer to the pickup location and a far side on the side opposite to its near side.

3. A feeder for individually dispensing surface-mount components as claimed in claim 2, the carrier tape comprising a cover tape covering the pockets, further comprising third means for removing the cover tape before a lead component reaches the component ejecting member, further comprising a winder for winding up the removed cover tape the winder comprising first and second separable means forming a hub for receiving the removed cover tape, a first set of two diametrically opposed circular arc segments of a given radius on one of the separable means, a second set of two diametrically opposed circular arc segments of a radius on the other of the separable means, the given radius being slightly larger than the radius of the second set of diametrically opposed circular arc segments, the arc segments of the first set being circumferentially displaced with respect to the arc segments of the second set, such that separation of the separable means results in the wound up cover tape being loosely retained on the slightly larger arc segments and is easily removed.

4. A feeder for individually dispensing surface-mount components from a carrier tape containing in pockets loose piece components for pickup by a pick-up member on a pick-and-place machine, the pick-and-place machine sending its pickup member to a pickup location on the feeder and the pickup member carrying a component returning to the pick and place machine, comprising:

A) means for feeding the carrier tape along a first path,

B) at least one component ejecting member positioned at a first position spaced from the pickup location, C) first means for moving the component ejecting member from its first position along a second path to a second position at the pickup location, said means for moving including means for ejecting a lead component from its pocket on the carrier and moving the ejected component to the pickup location, D) second means for retaining the lead component at the pickup location awaiting arrival of the pickup member, E) means for sensing the arrival of the pickup member, F) means in response to sensing the arrival of the pickup member for:

(i) releasing the lead component currently held at the pickup location allowing the released component to be picked up by the arriving pickup member, (ii) returning the component ejecting member to its first position, (iii) advancing the carrier tape to provide a new lead component, G) the pickup location being laterally spaced from the first path, and the second path being transverse to the first path, H) the carrier tape having an elongated length dimension and a shorter width dimension defining major opposed sides, the carrier tape being oriented with its major opposed sides extending vertically as it traverses the first path, the first position of the component ejecting member being adjacent the far side of the carrier tape and the second position of the component ejecting member being adjacent the near side of the carrier tape.

5. A feeder for individually dispensing surface-mount components from a carrier tape containing in pockets loose piece components for pickup by a pick-up member on a pick-and-place machine, the pick-and-place machine sending its pickup member to a pickup location on the feeder and the pickup member carrying a component returning to the pick and place machine, comprising:

A) means for feeding the carrier tape along a first path,

B) at least one component ejecting member positioned at a first position spaced from the pickup location, C) first means for moving the component ejecting member from its first position along a second path to a second position at the pickup location, said means for moving including means for ejecting a lead component from its pocket on the carrier and moving the ejected component to the pickup location, D) second means for retaining the lead component at the pickup location awaiting arrival of the pickup member, E) means for sensing the arrival of the pickup member, F) means in response to sensing the arrival of the pickup member for:

(i) releasing the lead component currently held at the pickup location allowing the released component to be picked up by the arriving pickup member, (ii) returning the component ejecting member to its first position, (iii) advancing the carrier tape to provide a new lead component, G) each of the carrier tape pockets being completely closed except for a larger opening in a front side and a smaller opening on a back side opposite to the front side, the larger opening being larger than the component, the smaller opening being smaller than the component, and when the carrier tape is on its first path it extends vertically with the larger opening facing the pickup location and the smaller opening facing the component ejecting member when in its first position.

6. A feeder for individually dispensing surface-mount components as claimed in claim 5, wherein the component ejecting member comprises a part configured for entering the pocket of the lead component via the opening in its back side and for pushing the component out of the pocket via the larger opening in its front side into contact with the second means for retaining the lead component.

7. A feeder for individually dispensing surface-mount components as claimed in claim 6, wherein the second means has a first position adjacent the front side of the carrier tape and a second position at the pickup location, the component ejecting member in traversing its second path also pushes the second means from its first to its second position and also assists in holding the ejected lead component at the pickup location.

8. A feeder for individually dispensing surface-mount components as claimed in claim 7, wherein the second means comprises one of a V-block or a flat surface, and the component ejecting member part has the other of the V-block or flat surface such that both the V-block and the flat surface cooperate to retain the ejected component.

9. A feeder for individually dispensing surface-mount components as claimed in claim 5, wherein the carrier tape pockets each have two vertically spaced holes on its back side, and the component ejecting member comprises two pins extending toward the far side of the carrier tape and oriented to enter the two vertically spaced pocket holes from its back side.

10. A feeder for individually dispensing surface-mount components as claimed in claim 6, wherein:

(i) the carrier tape has sprocket holes, the means for feeding the carrier tape comprises a drive wheel having driving teeth for engaging the sprocket holes of the carrier tape, the driving teeth forming an interference fit with the engaged sprocket holes.

11. A feeder for individually dispensing SMT components from a carrier tape containing in pockets loose piece components for pickup by a pick-up member on a pick-and-place machine, the pick-and-place machine sending its pickup member to a pickup location on the feeder and the pickup member carrying a component returning to the pick and place machine, the carrier tape having an elongated length dimension and a shorter width dimension defining major opposed sides, comprising:

A) means for feeding the carrier tape oriented with its major opposed sides extending vertically along a first path, the carrier tape having a near major side closer to the pickup location and a far major side on the side opposite to its near side, the carrier tape pockets each having an open front and at least one hole in its back side, B) at least one component ejecting member positioned at a first position spaced from the pickup location and adjacent the far side of the carrier tape, the hole in the back side of the carrier tape pockets facing the component ejecting member when in its first position, C) first means for moving the component ejecting member from its first position along a second path to a second position adjacent the near side of the carrier tape and at the pickup location, said means for moving including means for entering the back side hole of a pocket and for ejecting the component from its pocket on the carrier and moving the ejected component to the pickup location, the pickup location being laterally spaced from the first path, and the second path being transverse to the first path, D) second means for retaining the lead component at the pickup location awaiting arrival of the pickup member, the second means cooperating with the component ejecting member to receive and hold the component when ejected from its pocket, E) means for sensing the arrival of the pickup member, F) means in response to sensing the arrival of the pickup member for:

(i) releasing the lead component currently held at the pickup location allowing the released component to be picked up by the arriving pickup member, G) means in response to sensing the departure of the pickup member for:

(i) returning the component ejecting member to its first position, (ii) advancing the carrier tape to provide a new lead component.

12. A feeder for individually dispensing SMT components as claimed in claim 11, further comprising timing means set such that:

i) the lead component when held at the pickup location is not released until a given time after arrival of the pickup member to ensure that the pickup member securely holds the component, ii) the carrier tape is not advanced until the component ejecting member has returned to its first position.

13. A feeder for individually dispensing SMT components as claimed in claim 12, further comprising a controller for controlling the operation cycle of the feeder and programmed to perform a first sequence of steps and a second sequence of steps, the first sequence of steps being performed in response to sensing the arrival of the pickup member, the second sequence of steps being performed in response to the picked up component leaving the pickup location.

* * * * *